(12) United States Patent
Cosman

(10) Patent No.: US 6,525,740 B1
(45) Date of Patent: Feb. 25, 2003

(54) SYSTEM AND METHOD FOR ANTIALIASING BUMP TEXTURE AND BUMP MAPPING

(75) Inventor: Michael A. Cosman, South Jordan, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/271,588

(22) Filed: Mar. 18, 1999

(51) Int. Cl.[7] .............................................. G06T 11/40
(52) U.S. Cl. ...................................... 345/584; 345/611
(58) Field of Search ................................ 345/419, 426, 345/584, 611

(56) References Cited

U.S. PATENT DOCUMENTS

| | | | | |
|---|---|---|---|---|
| 5,659,671 A | * | 8/1997 | Tannenbaum et al. | 345/426 |
| 5,900,881 A | * | 5/1999 | Ikedo | 345/426 |
| 6,014,144 A | * | 1/2000 | Nelson et al. | 345/426 |
| 6,078,333 A | * | 6/2000 | Wittig et al. | 345/426 |
| 6,141,013 A | * | 10/2000 | Nelson et al. | 345/426 |

FOREIGN PATENT DOCUMENTS

DE     19721416 A1     1/1999

OTHER PUBLICATIONS

Andreas Schilling, "A New Simple and Efficient Antialiasing With Subpixel Masks," Computer Graphics, vol. 25, No. 4, Jul., 1991.

Blinn, J., "Simulation of Wrinkled Surfaces", Siggraph '78 Proceedings.

Becker et al., "Smooth Transitions Between Bump Rendering Algorithms", Computer Graphics Proceedings 1993.

Peercy et al., "Efficient Bump Mapping Hardware", Computer Graphics Proceedings 1997.

\* cited by examiner

Primary Examiner—Matthew Luu
Assistant Examiner—Chante E. Harrison
(74) Attorney, Agent, or Firm—Thorpe North & Western, LLP

(57) ABSTRACT

A system and method for antialiasing bump texture and bump mapping which overcomes the disadvantages of previous methods of antialiasing bump maps without significantly expanding the required physical hardware needed for the calculations. A bump curvature value computed from the difference in heights between adjacent texels is applied to the specular shading calculations for bump maps. The bump curvature is used to open an "integration window" over the specular highlight of the bump. The resulting integral provides a highlight value which approximates the specular highlight. The highlight value is then added to the pixel shading value in the frame buffer. The process decreases the brightness of the highlights while increasing the overall brightness near the highlights, in a user-controlled blend that preserves the proper average effect of the specularity or reflectiveness. The process has no effect where there are no bumps or where the viewer is so close to the surface. Two user-supplied coefficients properly account for the content of the bump texture and the values of the surface materials coefficients.

22 Claims, 13 Drawing Sheets a) Surface Profile b) Height Values c) Height Deltas/Tip Values Stored in Bump Map d) Bump Normals on Polygon e) Displayed Surface Appearance

SYSTEM AND METHOD FOR ANTIALIASING BUMP TEXTURE AND BUMP MAPPING

BACKGROUND OF THE INVENTION

1. Field of the Invention

This invention relates generally to the field of computer graphics displays, and more particularly to antialiasing of specular highlights on bump mapped textures in a computer graphics display.

2. State of the Art

Computers have been used for many years to do image and graphics generation. In recent years computer generated graphics have become more and more sophisticated, and as the power of computer equipment has increased, users expectations of what the computer should do have also increased. Computer users have come to expect more realism in the graphics which generally means that there are more objects, and more light and texture processing on those objects.

Complex images and scenes are mathematically modeled in three-dimensional space in the computer memory and manipulated accordingly. These three-dimensional mathematical models are called wire frames because all the edges of the object are visible at the same time when displayed. Three-dimensional models are made to look more realistic by removing the edges which should be hidden and by applying color and shading to the visible surfaces of the model. Texture also improves a simple polygon model by adding opacity and color variations. Textures are essentially the application of a photographic or drawn pattern onto the object model to make it look more realistic. These textures usually consist of patterns such as rock, cloth, bark, gravel, or any other imaginable type of texture or picture.

As is well known, basic computer images are formed with thousands of points or pixels on a graphic display. Each pixel is a square physical display unit having a particular shade and color that a computer generates on the graphic display screen. By manipulating large numbers of pixels, patterns emerge to form an identifiable picture.

Textures are very useful when making modeled objects seem more realistic but the illusion breaks down when the texture is intended to show shape variations, such as bumps, on the object because the illumination effects are fixed into the texture. This is similar to rotating a painting in a real light source, the painting's light and shadow remain as they were originally painted no matter how the real light source moves. When a modeled object rotates, the texture cannot show real time shading on the texturized surfaces of the objects. The solution to this problem is to use bump mapped textures to affect the appearance of a surface by modifying its surface orientation, pixel by pixel, prior to the application of the illumination model.

To create the illusion of bumps, a bump texture map contains values for each texel, that define the local "tip" or "tilt" which is applied to the instantaneous surface normal. There are two signed values associated with each bump texel to define the forward or backward tilt in each of the two texture directions. These bump texture directions are the U and V texture directions of which are cotangent with the bump maps normal plane as shown in FIG. 1.

FIGS. 2a)–e) shows how bump tilt values are derived and then used to reconstruct the appearance of the bump when the bump texture is applied to a flat polygon. A bump is created by processing height values in a height map, defined momentarily, into local tilt values, usually by computing local height differences in the two map directions (only one direction is shown in FIG. 2). A height map is a texture map which includes values to define the height of each texel.

Computer image generation technology has advanced enough to allow the cost-effective addition of bump maps to the existing toolbox of shading and illumination features. Bump texture supplies the same apparent surface shape detail that would otherwise require thousands or millions of pixel-size polygons by operating through the illumination and shading process.

When this tilted surface normal vector is used in the illumination calculations, the perturbations applied to it by the bump texture cause variations in shading. These variations affect the diffuse and specular (reflective) illumination calculations, and create a compelling illusion of surface bumpiness. The illusion turns out remarkably well because the texture causes a well-behaved, spatially stable, coherent modification of the pixel-by-pixel surface orientation, much like using actual polygons to model bumps. As the surface, the observer, or the lights move about, the resultant shading changes are accurate portrayals of a solid underlying physical model. The illusion is so compelling that the viewer usually ignores the lack of silhouette roughness in bump-mapped objects.

Like other textures, bump texture can cause distracting image artifacts like crawling and flickering if texels are skipped over during the pixel computation process. Texels can be skipped when a texture with a high level of detail is compressed so it can be viewed as though it were farther away. Bump maps, like other textures, utilize the MIP mapping technique of switching between low- and high-resolution versions of the same texture depending on the viewer's distance from the object, to reduce the jagged aliasing effect. As shown in FIG. 3, MIP maps have a succession of coarser levels of detail which are selected as needed to ensure that no texels are skipped over.

The MIP process is the first line of defense in antialiasing bump texture. Unfortunately, bump texture aliasing during shading has no counterpart in regular texture and it is not well controlled by the MIP process. Shading involves computing and adding highlights and shading after texture has been applied to the image to achieve greater realism. When bump texture is used with specular shading, the specular illumination term creates a bright highlight whose size is partly determined by the surface material's specular exponent and the surface curvature.

The specular highlight is the reflection of the light source by the surface, and the specular exponent controls the shininess of the surface, and hence the size of the highlight. When a shiny surface is decorated with a bump texture, each bump becomes a curved "mirror" that potentially reflects a small specular highlight. The size of a specular highlight can be many times smaller than the bump that reflects it, so forcing bump texels to be larger than a pixel does not insure that the specular highlights will be larger than a pixel. When a specular highlight gets smaller than a pixel, it gets intermittently skipped over during the rendering process because the shading equation is evaluated only at the center of the pixel and so the visual effect is distracting crawling and flickering.

The flickering and sparkling effect is increased by the movement of the viewer because as the pixel normal moves in relation to the viewer, the specular highlight moves twice as fast across a pixel surface and flickers even more. This effect is due to the symmetrical reflection of light rays. As the pixel normal moves in relation to the viewer, the reflection ray is affected twice as much.

The rigorous solution is to oversample the pixel, perhaps at 16 or more positions in the mathematical model, and average the illumination results to calculate the display pixel. This requires 16 copies of the data to be stored in the computer hardware to evaluate the illumination model. This method is also a computationally intensive process that involves significant vector arithmetic and several exponentiations. Further, this method must be replicated for each additional light source that the system wants to handle in real time. Even with 16 samples, the result would still flicker significantly.

In essence, the bump map aliasing problem is caused by high surface curvature at small points of just a few texels. This is not unlike a small hemispherical mirror which tends to shrink or concentrate a reflection. The bumped texels create mirrors with high gain factors and cause extreme shrinkage of the specular highlight. What is needed is a sophisticated process that yields a realistic image with proper specular highlights but does not increase the hardware needed or require intensive calculations for the antialiasing process.

SUMMARY AND OBJECTS OF THE INVENTION

It is an object of the invention to provide a system for decreasing the brightness of the specular highlights in a well behaved way to control the highlight aliasing.

It is another object of the invention to provide a system for antialiasing with a minimum of object sampling to reduce the amount of hardware required for bump map antialiasing.

It is a further object of this invention to provide a system which eliminates or reduces flickering, crawling, sparkling, or other artifacts in the graphic representation which are a result of bump mapping.

It is also an object of the invention to provide a system for bump antialiasing which is not computationally intensive.

The above and other objects are realized by the present invention, disclosed in a specific illustrative embodiment of a system which utilizes a bump curvature value which is computed by the difference in tilt between adjacent bump texels. The bump curvature value determines an "integration window" or integration space over the specular highlight on the bump. The process of the present invention determines the approximate sum of the specular rays across the bump and averages the rays. The resulting value is added to the shading value of the pixel, so that the pixel value is an average specular brightness instead of flickering when the specular reflection hits the center of the pixel. This approximation reduces the brightness of the highlights and includes increasing the brightness near the highlights, in a user-controlled blend that preserves the proper average effect of the specularity.

DETAILED DESCRIPTION

This invention provides a method and apparatus for displaying a three-dimensional image with realistic specular highlights. The process and apparatus of the present invention focuses on the specular or reflective term of a shading equation, and particularly the effect of using large specular exponents, since these are the dominant factors in the aliasing problem.

Figure 4:
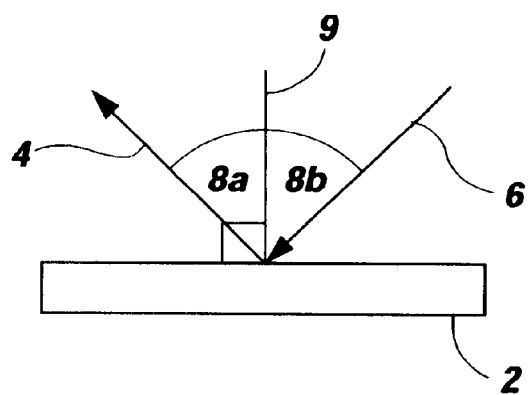
FIG. 4 is a side view of a light ray hitting an object's surface and showing the normal surface vector, the incident ray, and reflective ray.

Referring to FIG. 4, a light ray is shown hitting an object's surface 2 with the incident ray 6, and the reflection ray 4 displayed. The vector from the incident ray 6 to the object's surface 2 is reflected about the instantaneous surface normal vector 9 to define the direction of the reflection ray 4 which also defines the direction of the maximum specular highlight. If the viewer is aligned with or near this reflected ray 4, he sees the highlight. The incident ray angle 8b is equal to the reflected ray angle 8a. The brightness of the highlight diminishes as the viewer moves from the axis of the reflection ray 4.

Figure 5:
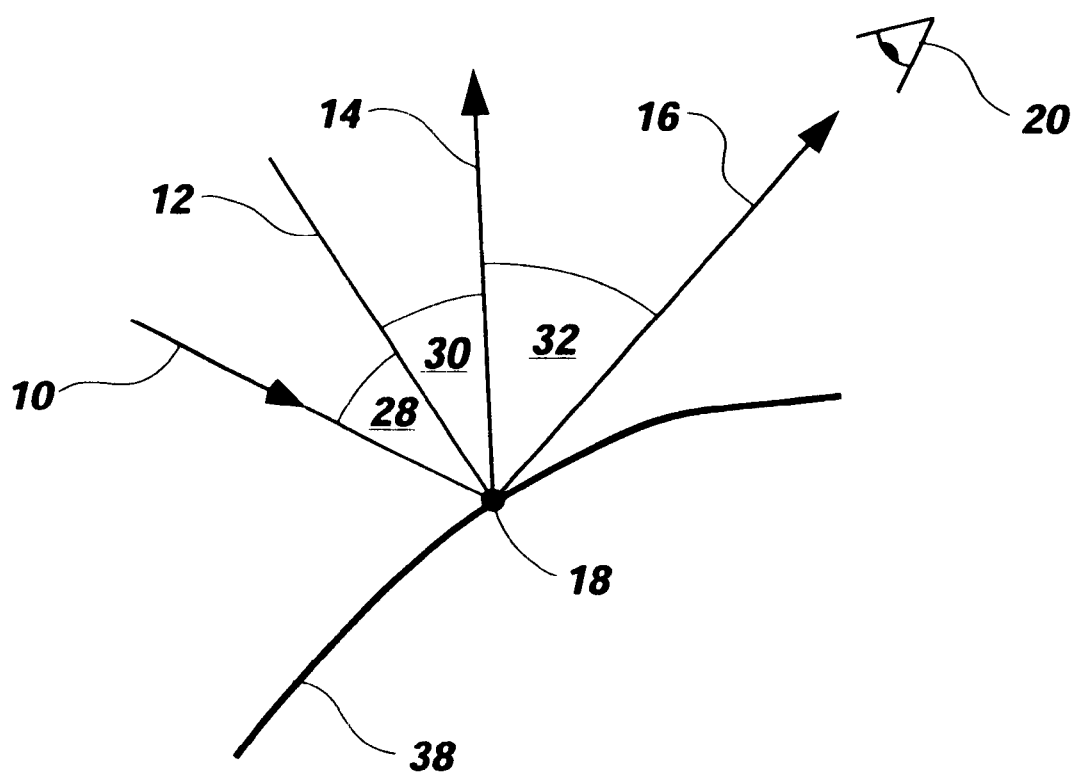
FIG. 5 is a side view of a light ray hitting a curved surface which is simulated by bump texels or pixels, and the angle of the resulting view ray.

Referring to FIG. 5, a light ray L 10 is shown hitting a point P 18 on a curved surface 38, which would be simulated by bump texels. The highlight the viewer 20 sees is determined by the scalar dot product of the reflection vector 14 and the view vector 16. A dot product yields the cosine of the angle 32 between the view vector 16 and the reflection vector 14, which is then raised to the power of the specular exponent. This method narrows the viewing angle 32 of the specular highlight 14 and causes an increasing appearance of shininess. The specular exponent is the power which controls the shininess of the surface. See *Computer Graphics: Principles and Practice.*, $2^{nd}$ Edition, Foley, van Dam, Feiner & Hughes, (Reprinted in 1991)(1990), by Addison-Wesley Publishing Company, at Section 16.3.2.

If we want to reduce the calculations made when there are multiple light sources, we can trace a ray from the viewer's eye, reflect it about the surface normal, and compare it with a ray from the light source (or multiple light sources). Calculating the angle between a reflected ray from the eye and a ray from each light source reduces the calculations needed when there are multiple light sources. So, in the description of the invention, the eye (view) vector is reflected symmetrically about the surface normal and the amount of specular reflection seen by the viewer is determined by L·R (where L is the incident light ray and R is the eye vector reflected about the surface normal).

Figure 6:
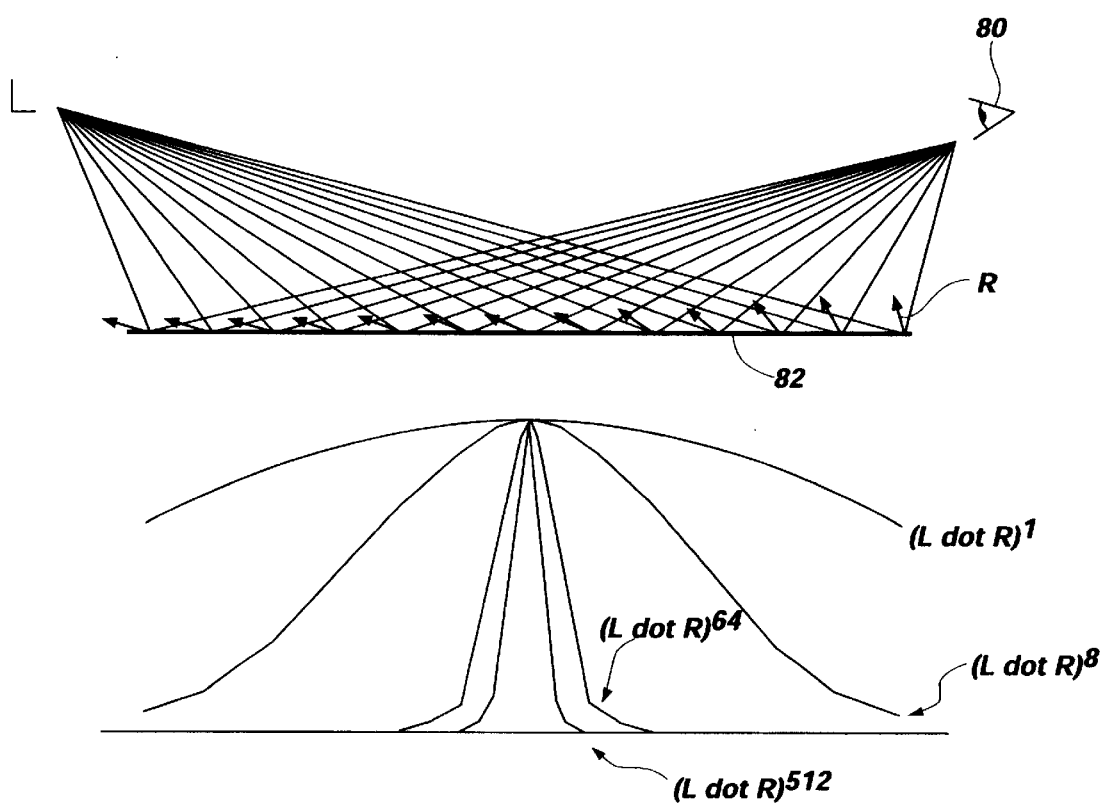
FIG. 6 is a side view of light rays hitting a flat surface to create a specular highlight and the corresponding view angle values $(L \cdot R)^n$ which exhibit different amounts of specularity based on the exponent n.

The size of the specular highlight is approximately cut in half for every four-fold increase in the specular exponent "n". For a light source at infinity, the specular highlight for an exponent of 1 is limited to about 180 degrees. FIG. 6 shows how a highlight shrinks on a flat surface as a result of increasing the specular exponent. The cosine of the angle between the reflected ray R from the eye 80 and the light ray L changes across the flat surface 82 creating the curve shown as $(L·R)^1$. The specular highlight shrinks when the specular exponent increases as seen by the lines indicated as $(L·R)^8$, $(L·R)^{64}$ and $(L·R)^{512}$. For example, with an exponent of 256 and a light source viewed at infinity, the specular highlight shrinks from 180 degrees to only about 12 degrees.

Figure 1:
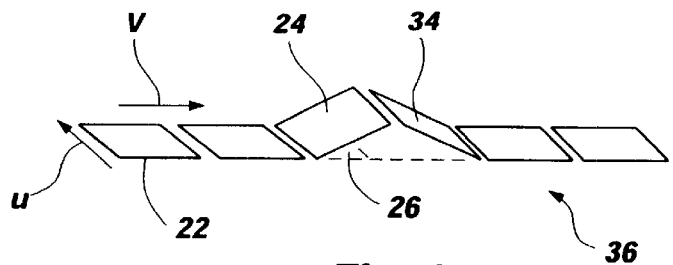
FIG. 1 is a side perspective view of bump mapped pixels showing texels which are at a 26 degree bump maximum.
Figure 2:
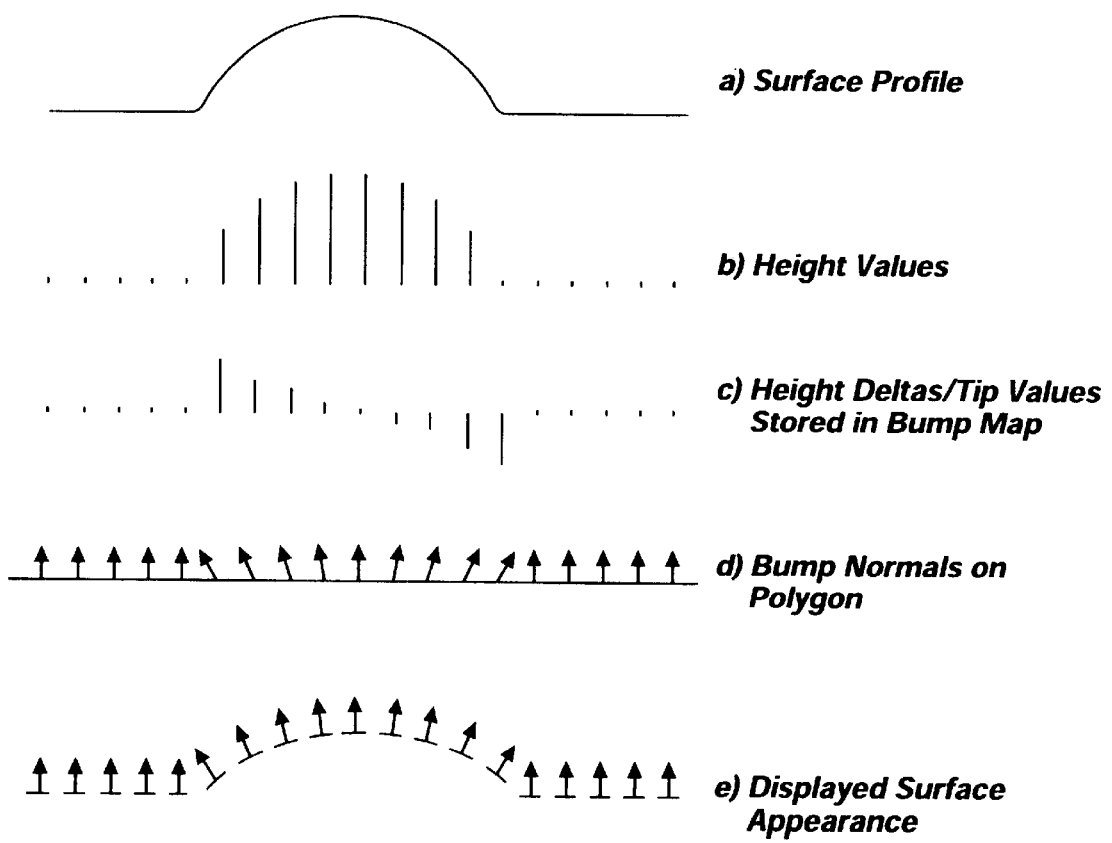
FIGS. 2a)–e) is a side view of a bump map and its associated height values, tip values, and surface normals on a polygon.
Figure 3:
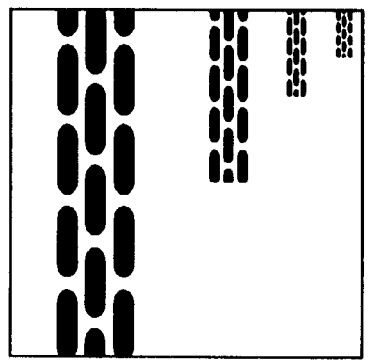
FIG. 3 is a MIP map with four levels of detail, each of which can be used separately depending on the relationship of the texel size to the projected pixel size.

Now consider the effect that bumps, such as FIG. 1, adds to specular highlights and the shading model. A bump 36 in a bump map contains tilt values in each texture direction, as shown by angle 26, and these extremes may occur adjacent to each other in the map. Even if the bump map is MIP mapped to ensure that bump texels are larger than pixels, the local bump curvature or slope can go from its positive maximum tilt to its negative maximum tilt in a single texel as shown by adjacent texels 24 and 34 in FIG. 1. For example, one texel 24 may have a −26 degree tilt value, and its adjacent neighbor texel 34, may have a +26 degree tilt.

Figure 7:
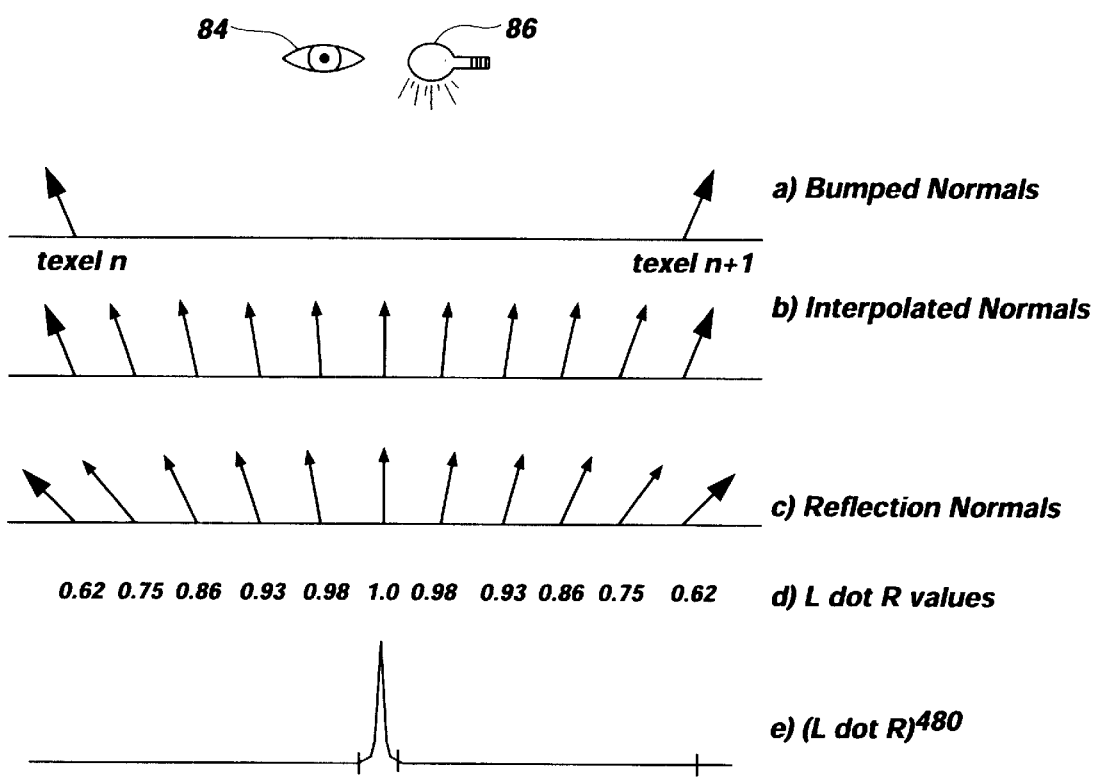
FIGS. 7a)–e) is a side view of a sub-texel specular highlight created by exponentiation.

In effect, the surface of the bump is a very small curved mirror that takes in everything within the curve and reflects it toward the eye. The effect of this tiny mirror is to shrink the specular highlights of any light sources. For the curvature example above, the total mirror field of view ("FOV") or combined reflection angle is 52 degrees, and if the specular highlight is smaller than about half that or 26 degrees, it will flicker in proportion to its FOV width compared to the mirror FOV. FIGS. 7a)–e) shows how a bumped texel which is much larger than a pixel can create a specular highlight that is much smaller than a pixel. Large specular exponents are being used in FIG. 7 and the viewer 84 and the light 86 are directly overhead. In addition, FIG. 7 shows that the bumped surface normal creates a reflection angle with the viewer 84 such that the (L·R) values are decreasing (7d) as the angle between the reflection rays and the viewer 84 increase (7c). The narrowed highlight is shown in FIG. 7e) where $(L·R)^{480}$. Thus, surfaces with specular exponents "n" greater than about 8 are potential sources of aliasing, because the specular highlight is compressed into a spot much smaller than the texel.

For example, if we are simulating waves on water, we probably want a fairly high specular exponent. If the wave map uses a +26 degree and −26 degree range of tilt, we will occasionally find pixels that subtend 52 specular degrees which contain 9-degree specular highlights. In this example, the specular highlight only covers about 1/33 of the pixel area when both the U and V directions are considered. Most of the time the specular highlight will not hit the pixel center where the shading equation is evaluated. Occasionally, the specular highlight will hit and will fully illuminate the pixel with a bright, intermittent sparkle.

If a 9-degree specular highlight exists inside a 52-degree pixel, then the pixel should be brightened by 1/33, regardless of the relative position of the highlight inside the pixel. The process of this invention approximates the brightening action with some algorithms. Using an approximation of the integral summation of all the possible reflected rays, including the specular highlight, allows the brightness of the pixel to be increased by the average of that approximated integral.

The preferred embodiment of the invention uses a bump-map component defined here as a curvature value, to affect two related mechanisms. One mechanism integrates or averages the highlights which decreases their brightness, and the other mechanism brightens nearby areas. These two effects are independently controlled by polygon coefficients supplied by the modeling programmer (or modeler), in order to achieve the desired aggregate effect.

Figure 8:
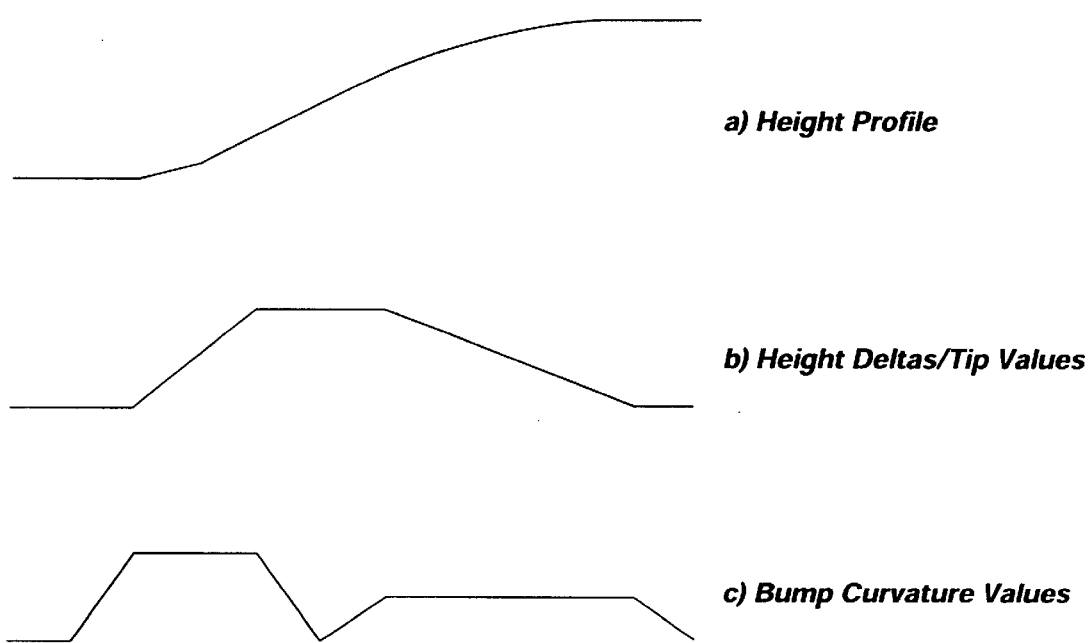
FIGS. 8a)–c) is a side view of bump curvature values as a function of the tilt values in a height profile.

The curvature value for each texel is defined as the largest absolute tilt difference between its bump components and the neighboring texel bump components. Values are calculated for neighbor texels in both directions U and V, and on the diagonals. Diagonal difference values are divided by the square root of 2 to scale them properly. The preferred absolute range of curvature values is 0 to 255, representing an angular range of zero to nearly one radian. FIGS. 8a)–c) shows how the bump curvature values are related to the largest absolute difference in the tilt values of the surrounding texels which in turn is related to the absolute height values of the bump map. This means that where the greatest curvatures exist the bump curvature values will be larger and increase the amount of bump map antialiasing performed.

The curvature values comprise a bump map component which can be used with MIP maps and tri-linearly blended just like the bump U and V values. Each of the curvature values are derived from the bump values at each associated MIP level of detail, not MIP mapped from high level of detail MIP curvature values.

Figure 9:
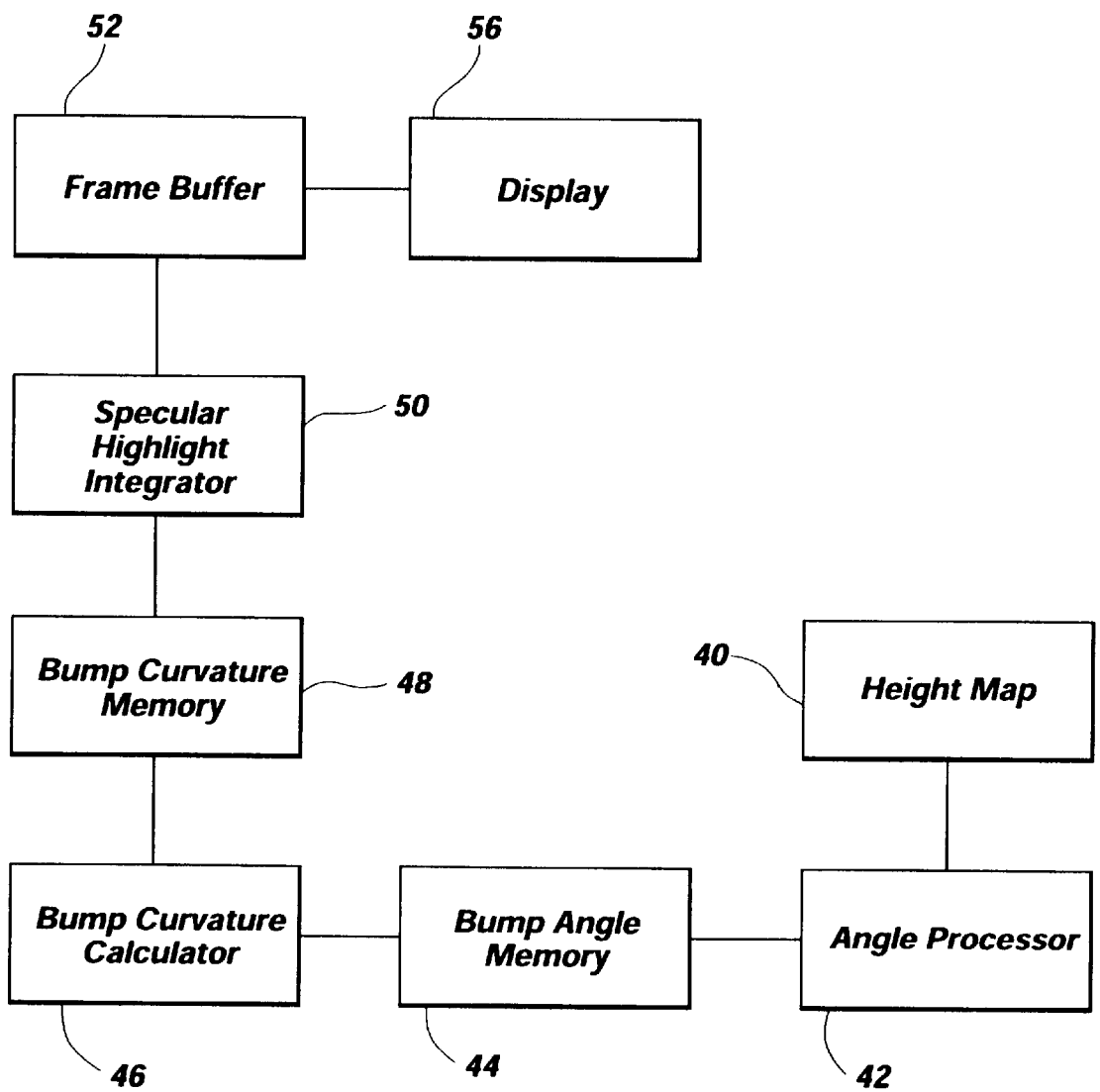
FIG. 9 is a block diagram illustrating one embodiment of the highlight integrator system constructed according to the present invention.

FIG. 9 is a block diagram illustrating one embodiment of the integration system, in which the angular tilts U and V are calculated by the angle processor 42 from the values in the height map 40 and stored in bump angle memory 44. Although the preferred method for generating the texel tilt values uses a height map, the texel tilt value could also be calculated using other angle calculation or storage methods. For example, the texel tilt values could be calculated from the geometric model and stored using polar coordinates. While the texel tilt values can be stored in a separate bump angle memory 44, they may also be stored in texture memory.

The curvature values are calculated by the bump curvature calculator 46 and stored in the curvature value memory 48. It should also be mentioned that the real-time graphic systems which use the invention pre-compute the bump curvatures and store them with the texture maps. The bump curvatures could also be derived directly from the analytical definition of the parametric surface. The texel tilt values are also preferably calculated prior to the real-time execution of the invention in the angle processor 42 and stored in the bump angle memory 44. The curvature value is then fed to a specular highlight integrator 50 which computes an integrated highlight value for each bump. The highlight value is added to the pixel value in the frame buffer 52 and provided to a conventional display unit 56.

The curvature value defines an integration interval in angle space that approximates the bump's angular "window" or coverage over the specular highlight. The window is centered about the surface normal defined by the value that comes from the L·R, where L is the incident light vector and R is the reflection of the eye vector about the bumped normal. The ideal situation would be to integrate the specular term of the shading function over this window in two dimensions. At this time, computations involving multiple integrations for real time graphics displays are not currently affordable in terms of hardware or time spent. This invention uses a simplified process instead that is affordable and yields a well-behaved, generally correct effect that suffices.

To understand this approximation, it must be realized that for large specular exponents in the shading equation the exponentiated cosine value is zero, except when the cosine value is close to 1. (See FIG. 7) For example, if the specular exponent is 100 (moderately shiny), then the cosine of angular values above about 19 degrees have a result less than 0.95 which yield exponentiated values that are effectively zero. If the center of the integration window (L·R value) is below 0.95, or if the window angle is comparatively wide (more than 0.2 or 0.1 for each angle half), then the resultant shading value will be nearly zero. It is important that the process gives good results when the window is narrow and the center value is close to 1. When the cosine value is 1, the associated view angle is zero or in other words the view ray is aligned with the reflection vector or the reflected view ray is aligned with the incident light ray.

Figure 11:
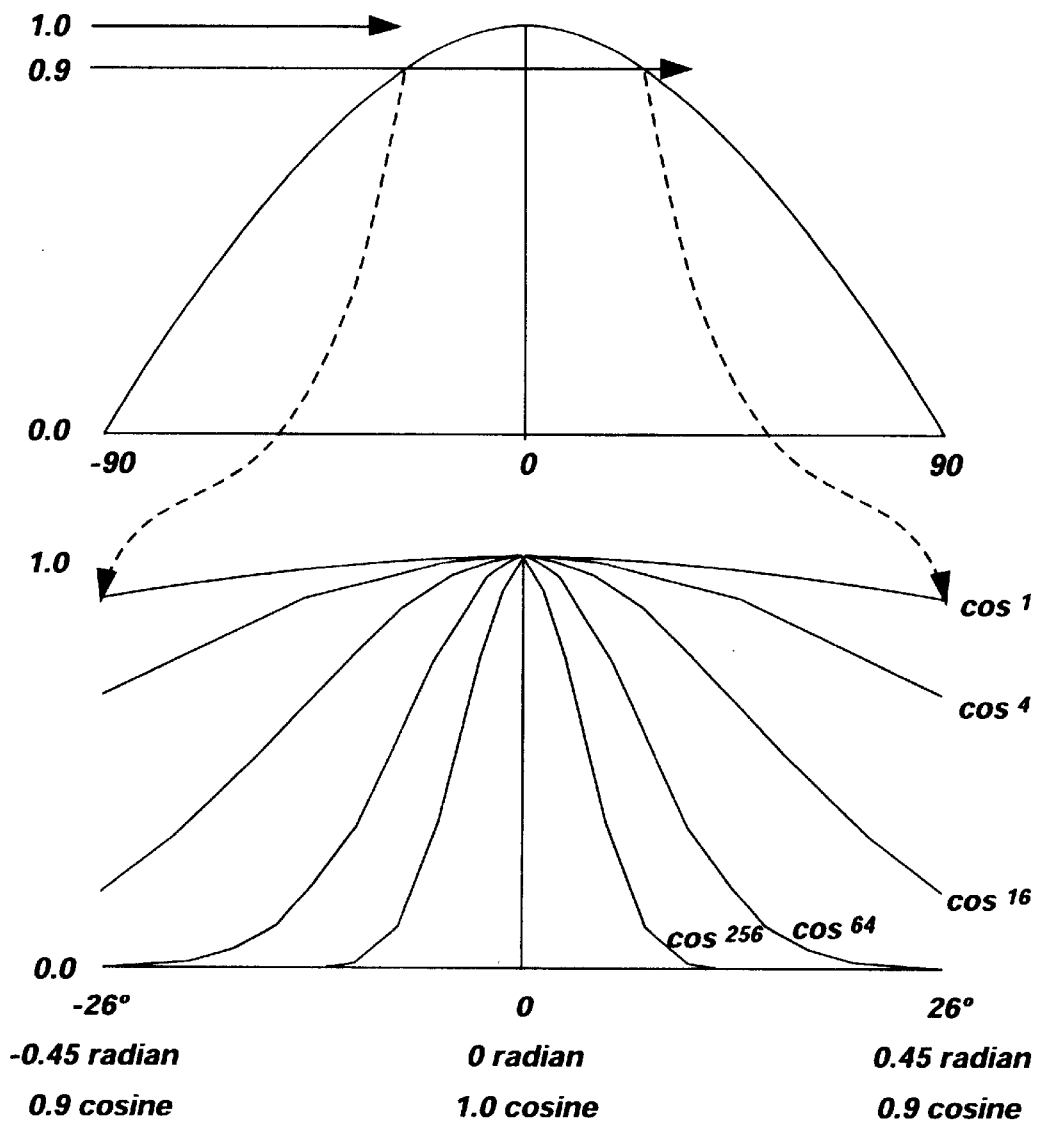
FIG. 11 is a detailed view of the portion of the cosine curve used by the antialiasing bump texture invention which shows how the detailed portion is related to the whole cosine curve.

FIG. 11 shows an expanded view of the cosine curve area which is used for the approximated integration, as it relates to the overall cosine curve. The example of tilts that can be between 26 and −26 degrees is shown in the figure. The cosine of 26 degrees (or 0.45 radian) is about 0.9 as shown at the bottom of the FIG. 11. Because the cosine value of the curvature angle is always near 1, the largest possible integration window goes from 0.9 to 1 and back to 0.9. For these cases, the window interval can be approximated in cosine space by approximating the interval in angle space by the factor 0.1. This is a very useful simplification because it gives us good sample points for the approximated integration or average. The approximation coefficient is modeled with the polygon, and will generally be zero or small until the specular exponent gets very large.

Figure 10:
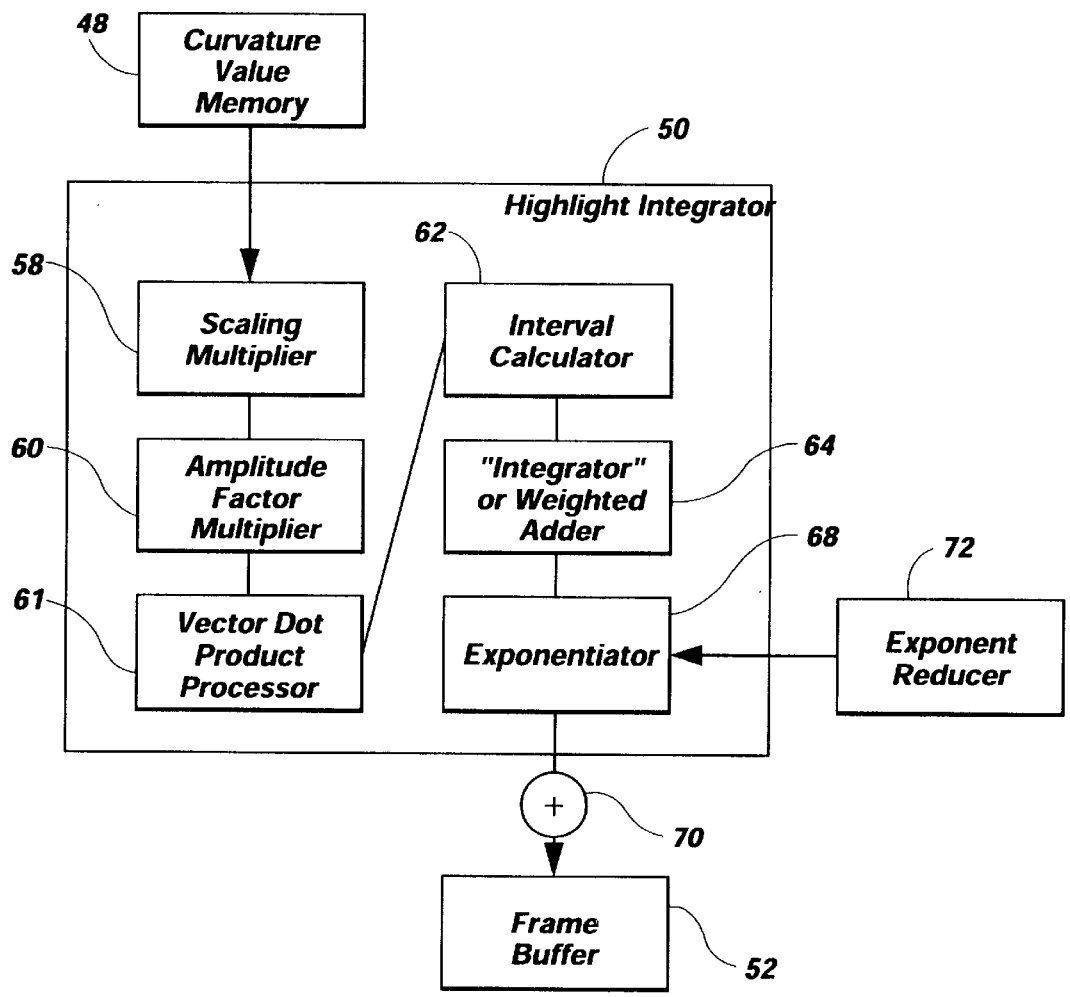
FIG. 10 is a block diagram of the highlight integrator for approximating bump map highlights.
Figure 12:
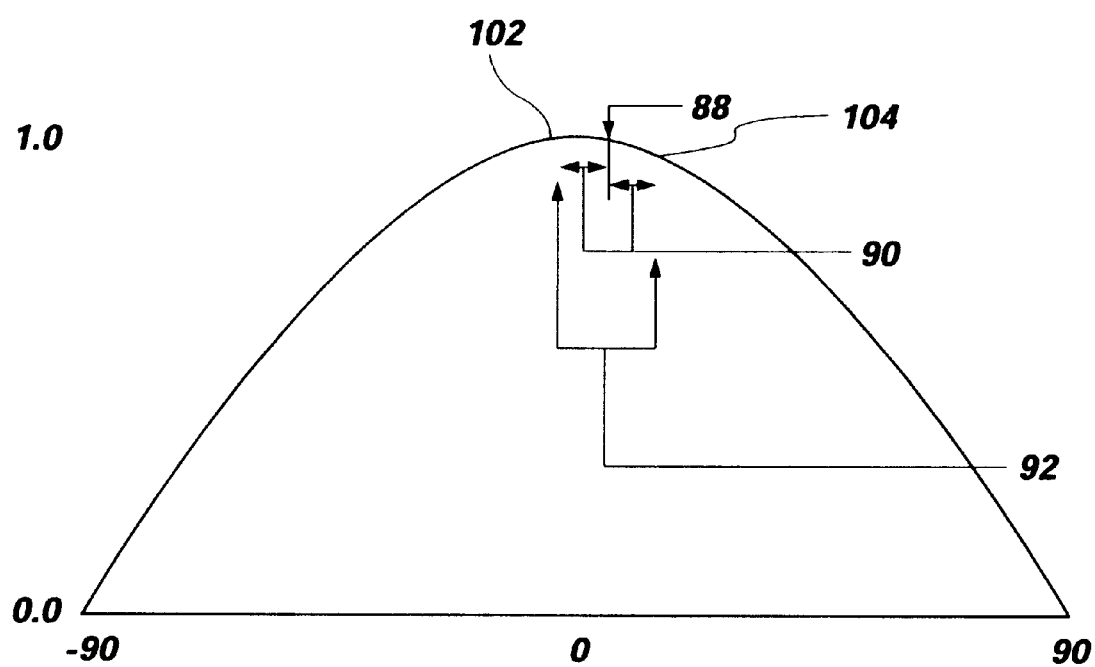
FIG. 12 shows the cosine curve integration interval on the cosine curve with center, right and left integration points.

This invention performs the approximated integration before the exponentiation to reduce the computing cost. In turn, it is hoped that the process will yield a well-behaved illusion that is consistent and believable. Referring further to FIG. 10, the integration of the values is performed by an integrator 64 (or weighted adder) before the exponentiator 68 processes the values, which enables the calculation of a single exponentiation per light source. The integration function carried out by the integrator 64 takes place in cosine space. Referring now to FIG. 12, the cosine function can be thought of as a simple curve where the points will be selected for the approximate integral. The center point 88 is defined by L·R on the cosine curve. The curvature value multiplied by a user defined value determines an interval 92 and two other points on the cosine curve, one to the left 102 and one to the right 104 of the (L·R) value. The cosine value at these two other points is simply L·R plus or minus the half interval 90. It should also be mentioned at this point that the curvature value can be modified by the user defined value to define an interval 92 and the user defined value is controlled by a curvature value control which may preferably be any standard type of hardware control such as a potentiometer which has varying inputs to control a variable, or it could be implemented in software where the user defined value can be increased or decreased through the software interface.

FIG. 10 is a block diagram of the highlight integrator 50. The curvature value for the current pixel is scaled by the smaller of 1 or the projected pixel size, in the scaling multiplier 58, to create the bump curvature value as each pixel is solved. As the viewer gets closer to the bumped surface, the scaling multiplier becomes smaller until it reaches zero. This provides a mechanism that gradually decreases and then turns off the effects controlled by curvature as the viewer gets close to the bump-mapped surface, where aliasing is no longer a problem.

The bump curvature is also scaled by an amplitude factor, which is generally used to correlate antialiasing effects with the specular exponent. The amplitude scaling operation takes place in the amplitude factor multiplier 60.

The value of L·R is calculated in the vector dot product processor 61 and produces a scalar product. The values of L·R plus or minus ½ of the bump curvature result are calculated in the interval calculator 62. It should be noted at this point that a signed L·R value is being used. The L·R plus the half-width may yield a value greater than 1, indicating that the interval straddles the peak of the cosine function. In this case, the result is replaced by 2 minus the result, to put it back on the cosine curve.

All three values (left, L·R and right) are limited to greater than zero, and summed with a 1:2:1 weighting in the weighted adder or integrator 64. The result sum is then divided by 4 to define the average cosine value over the interval, and fed to the specular exponentiator 68. The exponent used in the exponentiator 68 is affected by the exponent reducer 72, discussed below. The value received from the exponentiator 68 produces the shading value which is added at 70 to the pixel in frame buffer 52. If the curvature value is zero, or the user-supplied curvature scalar is zero, the entire process is effectively disabled and the specular result is unaffected. Also, we will apply the process everywhere, realizing that it will have little effect for small cosine values, which will be exponentiated to zero.

FIG. 12 shows a graphical representation of the method performed in the integrator component (FIG. 10) and a more specific example will now be given. If the light ray is 4 degrees off the reflected view ray, that produces a value of cosine(4) or 0.998, which is the center value on the cosine curve. Assuming the integration interval set by the bump curvature is 16 degrees then the half width of the interval is 8 degrees. Then the left point on the curve or the left value is calculated as 4−8=−4 degrees and the cosine(−4)=0.998. The right point on the curve or right value is calculated as 4+8=12 degrees and the cosine(12)=0.978. These values are then added together in the weighted average of 1:2:1 or left:center:right and divided by 4 to calculate 0.993. The resulting value of 0.993 is then raised to the specular exponent and then included as part of the specular shading which is stored in the invention as detailed above. These calculations can be mapped to other number domains which represent the same domain as the cosine curve. An example of this is the radian domain system (as opposed to degrees or polar coordinates), which represents a domain mapping for the divisions of a circle where 1 radian equals approximately 57 degrees.

In an alternative embodiment of this invention, a simplified calculation can be performed in the integrator component using radians to avoid extra cosine calculations for the left and right values. Referring again to the previous example, where the bump curvature value is 16 degrees and the interval half-width is 8 degrees or 0.14 radians this can be converted to the cosine curve by multiplying by approximately 0.1. This number is user controllable so we will use 0.09 for our example. As a result, 0.14*0.09=0.012. This interval value can then be added or subtracted from the center value to find the left and right values as follows:

left=0.998+0.012=1.01; right=0.998−0.012=0.986. In this example, the left value is greater than 1 so it is replaced with 2—the left value or 0.99. These values are then averaged together in the 1:2:1 weighting to get the same answer as before 0.993.

The apparatus and method described above decreases the brightness of specular highlights in a well behaved way that can control highlight aliasing, but it does not provide a compensating brightness increase for areas near the highlight, so its overall effect is to decrease the scene brightness due to specularity. In effect, it integrates the peaks properly, but not the valleys. To compensate for the brightness decrease in areas near the specular highlight a complementary computation is needed to raise the brightness of the scene to an overall average brightness that is believable.

Figure 13:
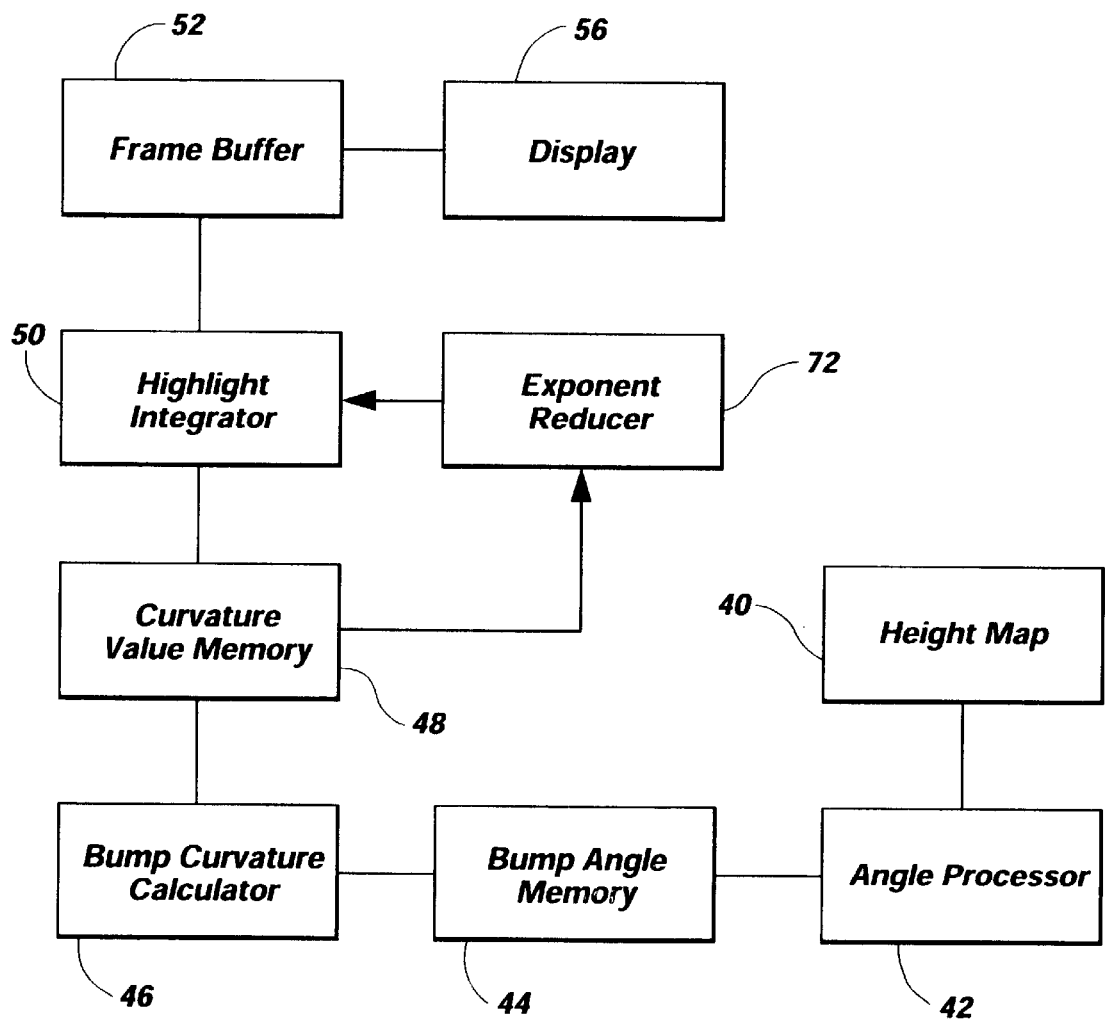
FIG. 13 is a block diagram of an alternative embodiment of the system shown in FIG. 9 which also increases the brightness of the surrounding areas near the highlights.
Figure 14:
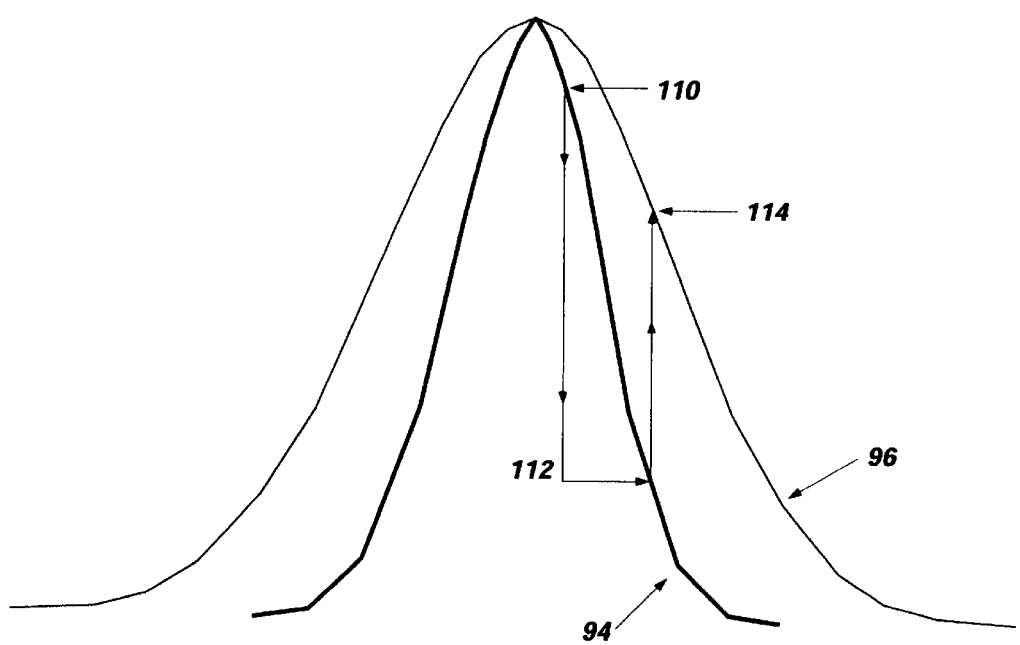
FIG. 14 shows curves of the specular highlight brightness compensation with and without the brightness compensation applied.

FIG. 13 provides an alternative embodiment of the highlight integrator, shown in FIG. 9. The highlight integrator 50 uses a modified exponent from the exponent reducer 72 to decrease the specular exponent value. The applied exponent is the modified exponent, divided by the larger of 1, or the bump curvature times a user-supplied coefficient. This coefficient should initially be chosen so that when the curvature value is at its maximum, the modeled exponent is reduced by about a factor of 8. For example, if the modeled exponent is 256, the user coefficient multiplied by the maximum curvature value could be 32. Like the window width coefficient, this value can be adjusted until the desired behavior is obtained. FIG. 14 is a comparison of areas surrounding a highlight with and without specular exponent adjustment. A curve of the area surrounding the specular highlight without any compensation is shown as the original specular exponent curve 94. The curve of the area surrounding the specular highlight with brightness compensation or the reduced specular exponent curve 96 is shown above the original specular exponent curve. The original L·R value 110 is shown on the original specular exponent curve. The averaged L·R value 112 is then shown on the original specular exponent curve, and then the L·R value 114 raised to the reduced specular exponent is shown on the reduced specular exponent curve 96. The actual modification values stored with a polygon to increase the brightness of areas surrounding the highlight will depend on the nature of the bump map, the bump amplitude scale factor, the specular exponent, the specular coefficient, and other visual attributes of the polygon. Again if the coefficients are zero, or if the curvature is zero, or if the viewer is very close to the surface, specular behavior is unaffected.

Applying the bump curvature gives the modeler wide latitude in controlling the specularity of bump maps in and nearby the highlight. For example, the limiting MIP level of detail for a bump map is where the bumps all disappear at the smallest MIP size, and their curvature goes to zero. Consider a wave bump map on a simulated ocean. Where the bumps exist, the modeler can tune the coefficients so that the average brightness of the ocean within the specular area is correct. The exponent reduction value is typically something much less than 1 and related to the average area of wave faces reflecting a highlight compared to the total ocean surface. Nearby waves, without bumps, will have full-brightness specular highlights, but only over a small portion of their surface area.

In the distance, where the bump map becomes very small using MIP mapping, the specular highlight on the water returns to full brightness, an erroneous condition. The modeler can force the distant specular behavior to match his mid-field effects by forcing the curvature component of the MIP map to a small but non-zero value towards the terminal level of details (LOD). Even though the wave bumps cannot be seen because they are too small, the system will provide a properly reduced intensity for the specular highlight, and a proper spatial spread. As the spatial frequency content in a bump map gets filtered out with each successive LOD, it should be compensated for by an increasing base level of "curvature" through the LODs. Modeling tools should provide handles for the modeler to apply such adjustments.

Figure 15:
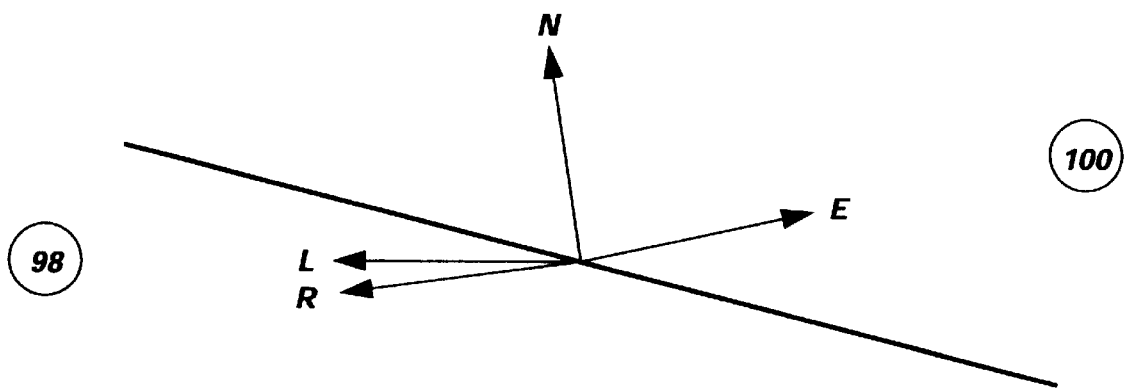
FIG. 15 shows a bumped surface backfaced to a light source.

There is another aliasing problem associated with specular shading. The specular highlight is maximized when the viewer is looking down the reflection vector. FIG. 15 illustrates a case where the viewer 100 is looking into a light 98 or "the sun" across a shiny surface that has illumination curvature, due to either smooth shading or bump maps. A sunset on the ocean is an example. Initially, the surface 106 is facing toward the light (opposite that shown in FIG. 15). The surface normal vectors N are mostly vertical, the incident light L is mostly horizontal, the view direction E and reflected view ray R are mostly horizontal, so the specular highlight is mostly maximized for the viewer. However, the lighting and specular highlight are cut off when the dot product of the surface normal N and the light vector L goes negative (i.e. when the surface 106 faces away from the light 98 as shown in FIG. 15). When shading effects are exactly correlated with surface geometry, this is the appropriate thing to do. This is not the case, where the entire shading strategy is geared to providing sophisticated shading effects on simple geometry. Where the shading doesn't agree with the geometry, but rather depends on surface normals that are not orthogonal and bumps which further perturb them, the strategy of cutting off the light does not work. Much of a visible ocean surface will have local surface normals that face away from the light source as a result of the bump mapping. The transition between facing toward and facing away from the light occurs suddenly between adjacent pixels, and the specular highlight is cut off sharply along jagged pixel boundaries. These boundaries tend to flicker and crawl when in motion.

The preferred embodiment of the invention solves this problem through a predetermined cut-off point for the specular effect as the local surface normal goes backfaced to the light. The specular term is decreased or eliminated as L·N goes from 0 to −¼, or some other negative limit. This fixes the ocean problem, but it means that a viewer in the shadow of a specular object may see some residual specular illumination in areas that should be completely dark. This is addressed with a second predetermined cutoff, concatenated with the first, based on the relative orientation of the non-bumped surface normal with the light. This second predetermined cutoff should be steeper than the cutoff using the bumped normal surface. There will still be minor occasional errors where surfaces get some specular illumination when they should not, but the invention only approximates real lighting conditions.

Except for the highlight integrator 50 and the exponent reducer 72, the block components in FIGS. 9, 10 and 13 are understood to be conventional components which are readily available in the computer graphics art or which may be assembled by a person of ordinary skill in the art without requiring inventive activity. The highlight integrator 50 and exponent reducer 72 are disclosed in sufficient detail to enable a person of ordinary skill in the art to assemble it from existing components or easily assembled components without inventive activity.

It will be appreciated that other embodiments of the present invention may be employed in many applications to accomplish the antialiasing of bump mapping highlights.

While certain preferred embodiments have been explained above, the appropriate scope hereof is deemed to be in accordance with the claims as set forth below.

What is claimed is:

1. Apparatus for antialiasing textured bumps in a textured bump map in a dynamic model image display system, the bumps having texel tilt values in U and V directions, which are calculated in an angle processor, comprising:

means for calculating bump curvature values from texel tilt values by determining the largest absolute difference between the texel's tilt values and the neighboring texel tilt values; and means for integrating the specular highlight of a textured bump by generating integration values for the highlights across the pixel based on the bump curvature values thereby creating a uniform antialiased highlight.

2. The apparatus of claim 1 further comprising:

a bump angle memory coupled to the angle processor, for storing the texel tilt values received from the angle processor; and a bump curvature memory for storing the bump curvature values calculated by the curvature value calculating means.

3. The apparatus of claim 1 further comprising:

a frame buffer for storing pixel values shaded by adding the integration values received from the means for integrating the specular highlight; and a display device coupled to the frame buffer to display the dynamic images.

4. The apparatus of claim 1 wherein the means for integrating the specular highlight further comprises:

a scaling multiplier coupled to a curvature value memory for multiplying the bump curvature value by the smaller value of 1 and a projected pixel size value to produce a scaled bump curvature value;

a multiplier coupled to receive the scaled bump curvature value and for multiplying the scaled bump curvature value received from the scaling multiplier by an amplitude factor to correlate antialiasing effects to the specular exponent;

a vector dot product processor coupled to the multiplier, for calculating a vector dot product of L, an incident angle of light, and R, a reflection of the eye vector about the bumped normal;

an interval calculator coupled to the vector dot product processor, to calculate the value of L·R plus ½ of the scaled bump curvature value, and the third value of L·R minus ½ of the scaled bump curvature value;

a highlight integration means which produces an integration value and integrates at least three values across a number space where L·R is a center point and is received from the vector dot product processor, and a second value is the center point plus ½ of a bump curvature interval and a third value is the center point minus ½ of the bump curvature interval; and an exponentiator coupled to receive the integration value and to raise the quantity computed in the integration means to the power of a specular exponent such that a reflected shading value is computed and added to the pixel value.

5. The apparatus of claim 4 wherein the highlight integration means uses integration values which are mapped to an alternate number domain and the center point, and a second point and a third point maintain their equivalent relative values in the alternate number domain.

6. The apparatus of claim 4 wherein the means for integrating the specular highlight further comprises a processor to sum values in cosine space received from the interval calculator to produce an integration value which is the sum of three point values, L·R, L·R plus ½ of the bump curvature value, and L·R minus ½ of the bump curvature value and the three point values are summed with a 1:2:1 weighting and then divided by 4 to define the average cosine value over the interval.

7. The apparatus of claim 1 wherein the means for integrating the specular highlight further comprises:

a scaling multiplier coupled to a curvature value memory for multiplying the bump curvature value by the smaller value of 1 and a projected scaled pixel size value to produce a scaled bump curvature value;

a multiplier coupled to receive the scaled bump curvature value for multiplying a scaled bump curvature value received from the scaling multiplier by a user-supplied amplitude factor to correlate antialiasing effects with the specular exponent;

a vector dot product processor coupled to the multiplier, for calculating a vector dot product of L, an incident angle of light, and R, a reflection of the eye vector about the bumped normal;

an interval calculator coupled to the vector dot product processor, to calculate a second value of L·R plus ½ of the bump curvature value, and a third value of L·R minus ½ of the bump curvature value;

a highlight integration means which converts the curvature value to radians and sums the values of the first value L·R, the second value and the third value, wherein the second and third integration points are calculated as L·R plus ½ of the bump curvature value in radians and L·R minus ½ of the bump curvature value in radians, respectively, and the three points are summed with a 1:2:1 weighting and then divided by 4 to define the average cosine value over the interval; and an exponentiator coupled to receive the integration value and to raise the quantity computed in the integration means to the power of a specular exponent such that a reflected shading value is computed and added to the pixel value.

8. The apparatus of claim 4 further comprising an adder means to add the reflected shading value from the exponentiator to the pixel value in a frame buffer.

9. The apparatus as described in claim 4 further comprising an exponent reducer which decreases the specular exponent by dividing the specular exponent by the larger value of 1 or the bump curvature value multiplied by a user set coefficient, wherein the user coefficient reduces the specular exponent when the bump curvature value is at its maximum, increasing the brightness of areas outside the specular highlight.

10. The apparatus as described in claim 9 further comprising a bump curvature value control means for the user to adjust and control the magnitude of the bump curvature value.

11. The apparatus as described in claim 9 further comprising a specular exponent control means for the user to adjust and control the amount the specular exponent is reduced.

12. The apparatus as described in claim 9 which further comprises:

a user controlled means for adjusting the curvature value width; and a user specular exponent control means for the user to adjust and control the amount the specular exponent is reduced.

13. A method for antialiasing textured bumps in a textured bump map in a dynamic model image display system, the bumps having texel tilt values in U and V directions, which are calculated in an angle processor, the method comprising the steps of:

computing bump curvature values by finding the absolute value of the difference in the texel tilt values between adjacent texels; and integrating the specular highlight of a textured bump by generating integration values representative of the highlights across the pixel, based on the bump curvature value.

14. The method of claim 13 wherein the integrating step further comprises:

multiplying each bump curvature value by the smaller of the value 1 or the projected pixel size to decrease antialiasing as a viewer gets closer to the textured bump map and produce a bump curvature value;

multiplying the bump curvature value by an amplitude to correlate the textured bump antialiasing with a specular exponent;

determining an average cosine value for each textured bump; and raising the average cosine value to a specular shading exponent such that a reflected shading value is computed which is added to a pixel value in a frame buffer.

15. The method of claim 14 wherein the step for determining the average cosine value comprises:

taking the vector dot product of L, the incident angle of light, and R, a reflection of the eye vector about the bumped normal; and integrating the value across the cosine space wherein the integration includes a center point at L·R and two other points on the curve are L·R plus ½ of the bump curvature value and L·R minus ½ of the bump curvature value and these three values are summed with a 1:2:1 weighting and then divided by 4 to define an average cosine value over the interval.

16. The method of claim 13 wherein the step of computing the bump curvature value by finding the absolute value of the height difference between adjacent texel values further comprises the step of finding an absolute value of the height difference for the adjacent texel values in the U and V directions and texel diagonals.

17. The method of claim 15 wherein the integration step is further comprised of the steps of:

replacing the value of the dot product of L and R plus ½ of the interval, with 2 minus the value, if the value is greater than 1.

18. The method of claim 14 wherein the method further comprises:

dividing the specular shading exponent by the larger value of 1 or the bump curvature value times a user supplied coefficient, whereby the brightness of an area surrounding a specular highlight is increased to result in an overall normal brightness.

19. The method of claim 13 where the method further comprises:

integrating the value across cosine space such that the specular behavior of a bump map is not affected when the curvature is 0 or if a viewer is close to the bump map.

20. The method of claim 14 wherein the method further comprises:

adjusting the bump curvature value so that distant specular highlights are reduced even though bumps in the bump map cannot be seen in a distant MIP map.

21. The method of claim 14 wherein the method further comprises:

adjusting the specular exponent to raise the brightness of areas near the specular highlight.

22. The method of claim 21 wherein the method of controlling the specular exponent further comprises:

adjusting the specular exponent to raise the brightness of areas near the specular highlight through dividing by the greater of the values 1 and the bump curvature value multiplied by a user controlled coefficient, such that the specular exponent is reduced as the curvature amplitude increases.

* * * * *